United States Patent
Monroe et al.

(10) Patent No.: US 7,110,913 B2
(45) Date of Patent: Sep. 19, 2006

(54) APPARATUS AND METHOD FOR MANAGING THE PERFORMANCE OF AN ELECTRONIC DEVICE

(75) Inventors: Howard Marshall Monroe, San Antonio, TX (US); Thomas Alan Mee, Fair Oaks Ranch, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 490 days.

(21) Appl. No.: 10/672,005

(22) Filed: Sep. 26, 2003

(65) Prior Publication Data

US 2004/0122647 A1 Jun. 24, 2004

Related U.S. Application Data

(60) Provisional application No. 60/436,169, filed on Dec. 23, 2002.

(51) Int. Cl.
*G06F 19/00* (2006.01)

(52) U.S. Cl. ............... 702/179; 702/186; 709/223; 709/224

(58) Field of Classification Search ............... None
See application file for complete search history.

(56) References Cited

U.S. PATENT DOCUMENTS

| | | | |
|---|---|---|---|
| 6,311,175 B1 * | 10/2001 | Adriaans et al. | 706/25 |
| 6,453,269 B1 * | 9/2002 | Quernemoen | 702/186 |
| 6,470,464 B1 * | 10/2002 | Bertram et al. | 714/37 |
| 6,574,587 B1 * | 6/2003 | Waclawski | 702/186 |
| 6,643,613 B1 * | 11/2003 | McGee et al. | 702/186 |
| 6,691,067 B1 * | 2/2004 | Ding et al. | 702/186 |
| 6,799,154 B1 * | 9/2004 | Aragones et al. | 703/22 |
| 6,826,575 B1 * | 11/2004 | Waclawski | 707/102 |
| 6,876,988 B1 * | 4/2005 | Helsper et al. | 706/21 |
| 6,917,849 B1 * | 7/2005 | Pasadyn et al. | 700/121 |
| 6,978,259 B1 * | 12/2005 | Anderson et al. | 706/19 |
| 2002/0049687 A1 * | 4/2002 | Helsper et al. | 706/45 |
| 2002/0133757 A1 * | 9/2002 | Bertram et al. | 714/47 |
| 2002/0183972 A1 * | 12/2002 | Enck et al. | 702/186 |
| 2002/0194251 A1 * | 12/2002 | Richter et al. | 709/105 |
| 2002/0198985 A1 * | 12/2002 | Fraenkel et al. | 709/224 |
| 2003/0036890 A1 * | 2/2003 | Billet et al. | 703/2 |
| 2003/0065986 A1 * | 4/2003 | Fraenkel et al. | 714/47 |
| 2003/0167151 A1 * | 9/2003 | Ding et al. | 702/186 |
| 2003/0225877 A1 * | 12/2003 | Packman et al. | 709/224 |
| 2004/0133395 A1 * | 7/2004 | Ding et al. | 702/182 |
| 2005/0169186 A1 * | 8/2005 | Qiu et al. | 370/242 |
| 2005/0278703 A1 * | 12/2005 | Lo et al. | 717/126 |
| 2006/0013134 A1 * | 1/2006 | Neuse | 370/230 |
| 2006/0020866 A1 * | 1/2006 | Lo et al. | 714/741 |
| 2006/0020923 A1 * | 1/2006 | Lo et al. | 717/127 |
| 2006/0020924 A1 * | 1/2006 | Lo et al. | 717/127 |

* cited by examiner

*Primary Examiner*—Patrick J. Assouad
(74) *Attorney, Agent, or Firm*—Woodcock Washburn LLP

(57) ABSTRACT

The present invention provides a performance management system and method for generating a plurality of forecasts for one or more electronic devices. The forecasts are generated from stored performance data and analyzed to determine which devices are likely to experience performance degradation within a predetermined period of time. A single forecast is extracted for further analysis such that computer modeling may be performed upon the performance data to enable the user to predict when device performance will begin to degrade. In one embodiment, graphical displays are created for those devices forecasted to perform at an undesirable level such that suspect devices may be subjected to further analysis.

9 Claims, 6 Drawing Sheets

APPARATUS AND METHOD FOR MANAGING THE PERFORMANCE OF AN ELECTRONIC DEVICE

This utility application claims priority on a U.S. Provisional Application entitled "Multiple Exponential Adaptive Triage," Ser. No. 60/436,169, having a filing date of Dec. 23, 2002.

FIELD OF THE INVENTION

The present invention relates generally to resource management and, more particularly, to a system and method of predicting and managing the performance of one or more electronic devices.

BACKGROUND OF THE INVENTION

Managing a computer system which includes a plurality of devices such as networks or servers, is of special interest to data processing or information technology personnel. Such computer systems typically include a plurality of diverse devices including memory, disks, local area network (LAN) adaptors and central processing units (CPUs) which interact in various ways to facilitate data processing applications.

As systems become larger and more complex, interactions between electronic devices become harder to define, model, and/or predict. Such systems may suffer from inefficiencies or "bottlenecks" that slow or even stop the system.

Often, the performance of a computer system or network is less than it could be because of one or more components having an inappropriate load applied thereto. Thus, it is desirable to know what changes to the system would be required in order to improve capacity of each electronic device. Further, such changes would allow the manipulation of a preset number of electronic devices instead of the system as a whole. To accomplish this, there remains a need for a system and method capable of collecting and analyzing performance data such that it may be utilized to predict future performance of individual electronic devices.

SUMMARY OF THE INVENTION

Accordingly, the present invention provides a performance management system and method capable of generating a plurality of forecasts for one or more electronic devices. The forecasts are generated from stored performance data and analyzed to determine which devices are likely to experience performance degradation within a predetermined period of time. A single forecast is chosen for further analysis such that computer modeling may be performed upon the performance data to enable the user to predict when device performance will begin to degrade. In one embodiment, graphical displays are created for devices forecasted to perform at an undesirable level within a predetermined period of time.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

The present invention is herein described as a method of managing one or more electronic devices and as a computer system for managing one or more electronic devices.

Figure 1:
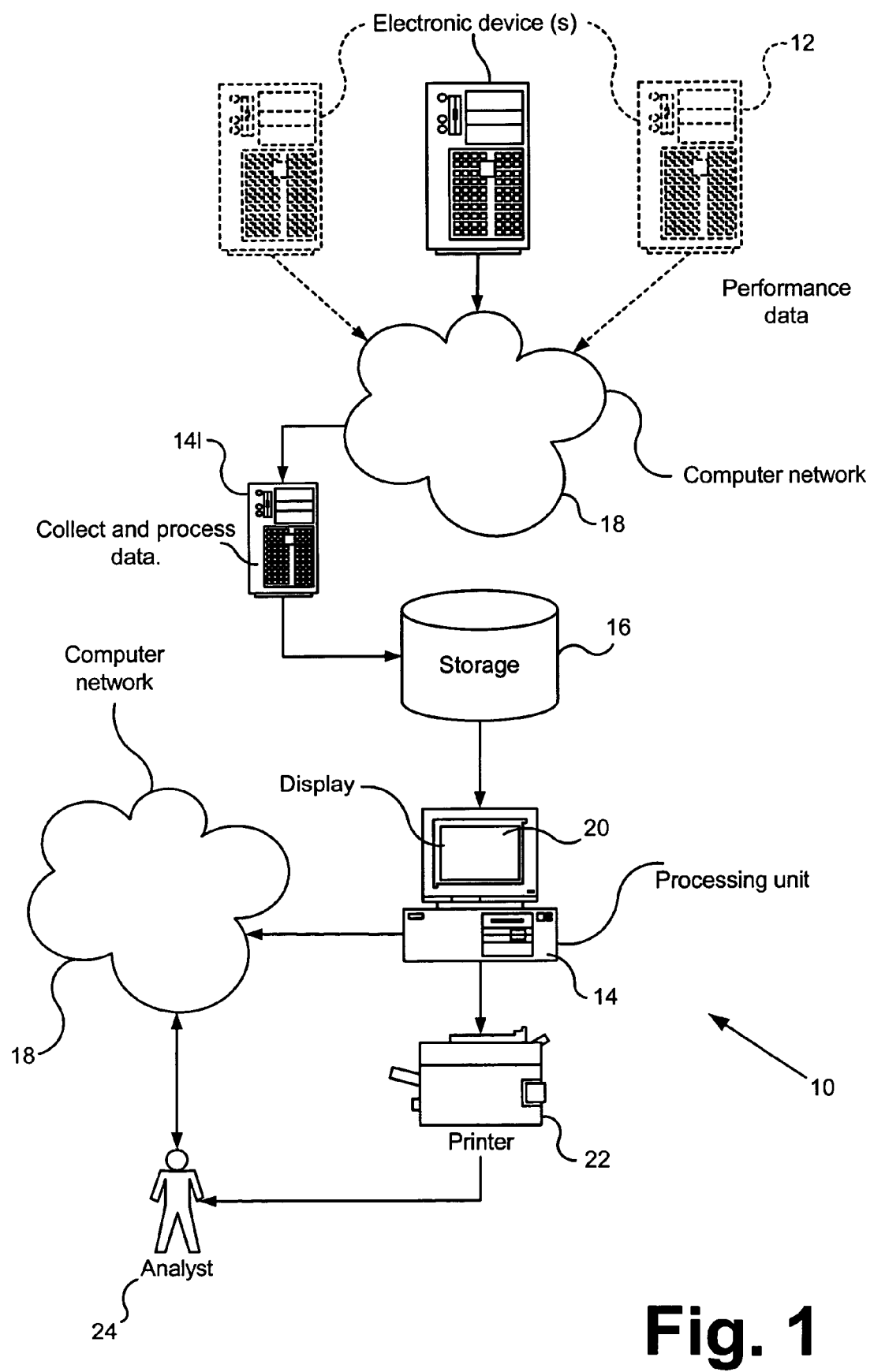
FIG. 1 is a component diagram of one embodiment of the present invention.

Referring to FIG. 1, the computer system (10) of the present invention is capable of receiving and analyzing data from any number of electronic devices (12). In one embodiment, data describing the performance of such devices is collated and processed by an intermediate processing unit (14I) prior to the storage of the data upon a storage device (16).

In another embodiment, performance data is fed through a computer network for storage upon the storage device. In this embodiment, the data is collated and processed by a central processing unit (14) coupled to each electronic device, as well as the computer network.

In one embodiment, the processing unit (14) of the present invention is equipped with a graphic display interface (20) capable of providing graphical displays of analyzed performance data, as discussed further below.

In one embodiment, the results of analysis performed by the processing unit may be sent either to a printer (22) for the creation of hard copy reports, or electronically to one or more analysis personnel (24). In one embodiment, such analyzed information may be transmitted through one or more computer networks (18). Further, the reporting capabilities of the present invention allow this system to provide the analyst with analysis summaries. This feature of the present invention provides the analyst with an overview of one or more of the electronic devices at issue, in order to allow the analyst to make an informed decision regarding which devices require attention.

For the purposes of illustration only, in one embodiment, the present invention may be utilized to determine when to upgrade an Intel® server, such as a Compaq® Pentium II® having a quad processor running at 333 MHz. A performance data collection tool residing on the server, Best 1 for example, is capable of capturing performance data every few seconds. Data is then sent to an IBM R/S 6000 midrange server, via a local area network (LAN), where it is collected and processed. A batch job is then run, using SAS® Proc Reg for example, which appends the data into a database stored on a storage area network (SAN). The data may then be gathered from the SAN and analyzed according to the present invention using, for example, a Dell® Desktop computer having a Pentium IV® processor operating at 1.7 GHz. Capacity charts may be displayed on the computer's monitor, sent to a printer, and/or stored electronically on the SAN.

Figure 2:
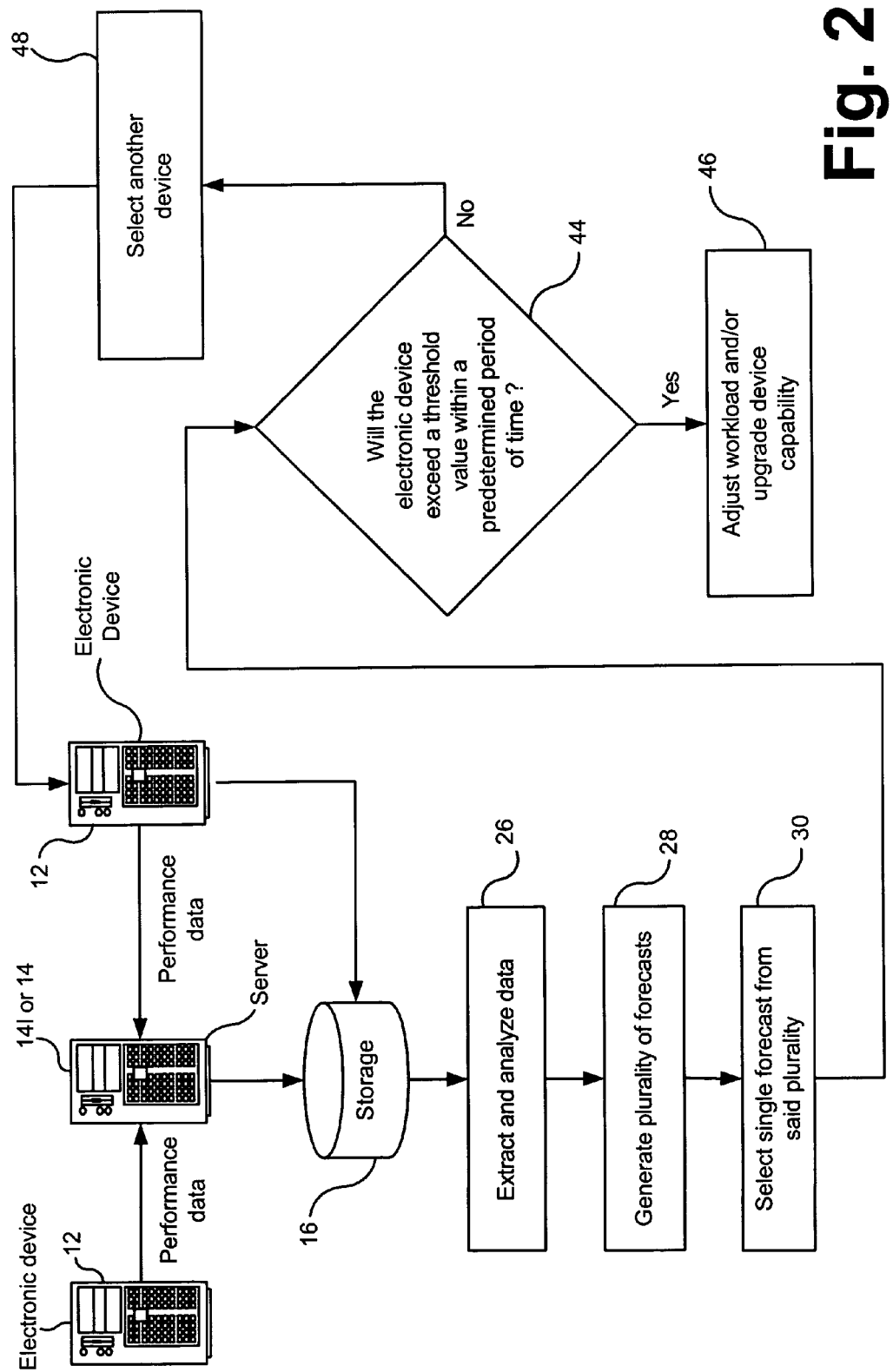
FIGS. 2, 3, 5 and 6 are process flow diagrams illustrating various embodiments of the present invention.
Figure 3:
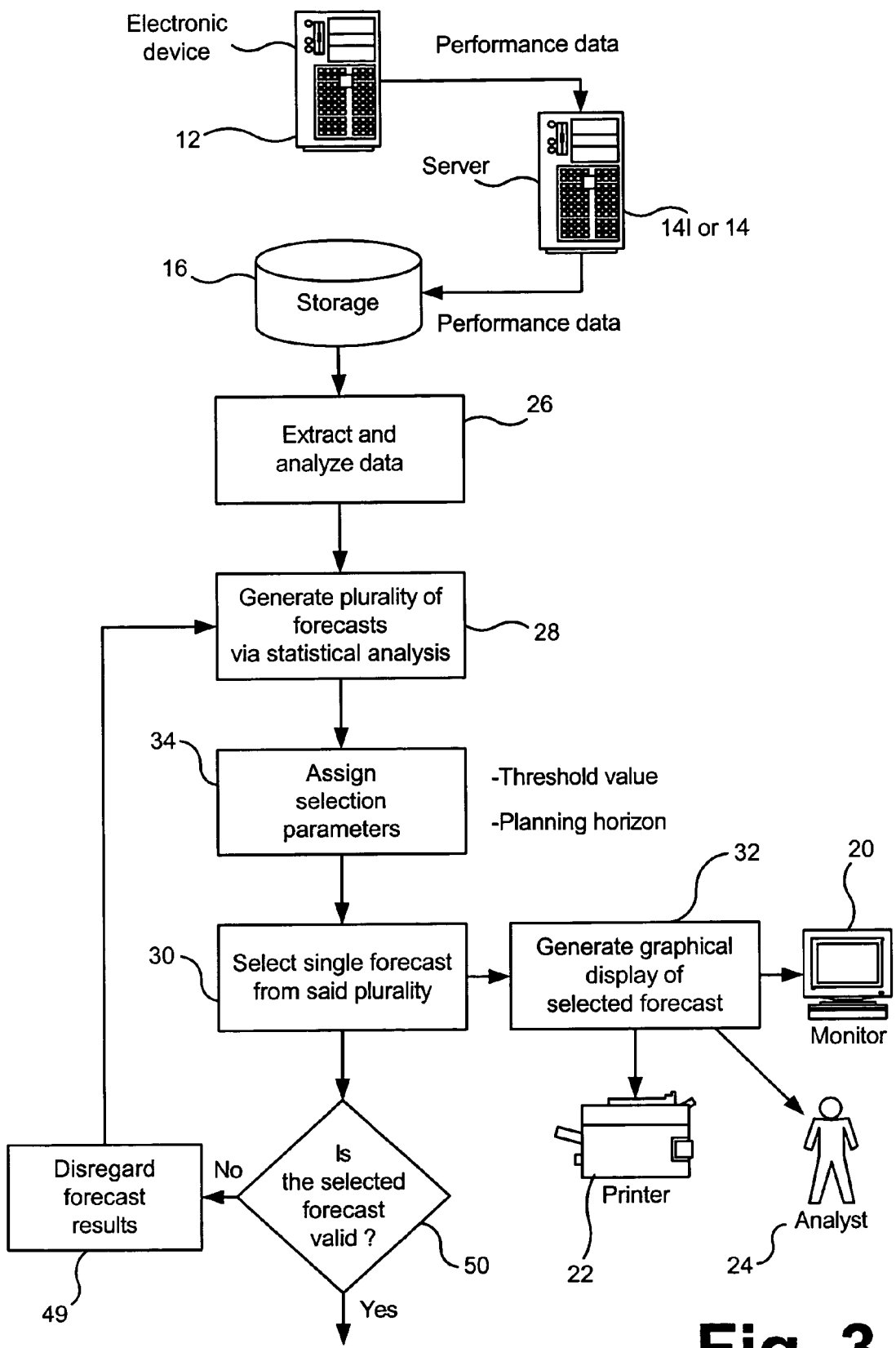

Referring to FIGS. 2 and 3, the present invention is capable of collecting data from a host of electronic devices in order to determine potential performance degradation over time. Referring to box (26), the present invention extracts and analyzes performance data held upon a storage device (16). In one embodiment, performance data is collected and analyzed by an intermediate processing unit (14I), described above. During processing, the data may be formatted such that it may be analyzed by any number of known statistical analysis systems. In one embodiment, performance data is analyzed by Statistical Analysis System® (SAS) software capable of applying a host of statistical procedures and data management tools.

Such statistical analysis systems are utilized by the present invention to generate a plurality of forecasts relating to the performance of one or more electronic devices. In one embodiment, the present invention is utilized to analyze one or more servers such that a plurality of forecasts may be generated for each one, as illustrated by box (28).

The present invention may utilize any number of known statistical methods, in order to generate a plurality of forecasts for each device. In one embodiment, the system (10) of the present invention generates graphical displays of each forecast for review by the user, as illustrated by box (32). In one embodiment, such displays may be used to provide the user with an overview of a device's capacity as well as fluctuations over any given period of time.

Figure 4:
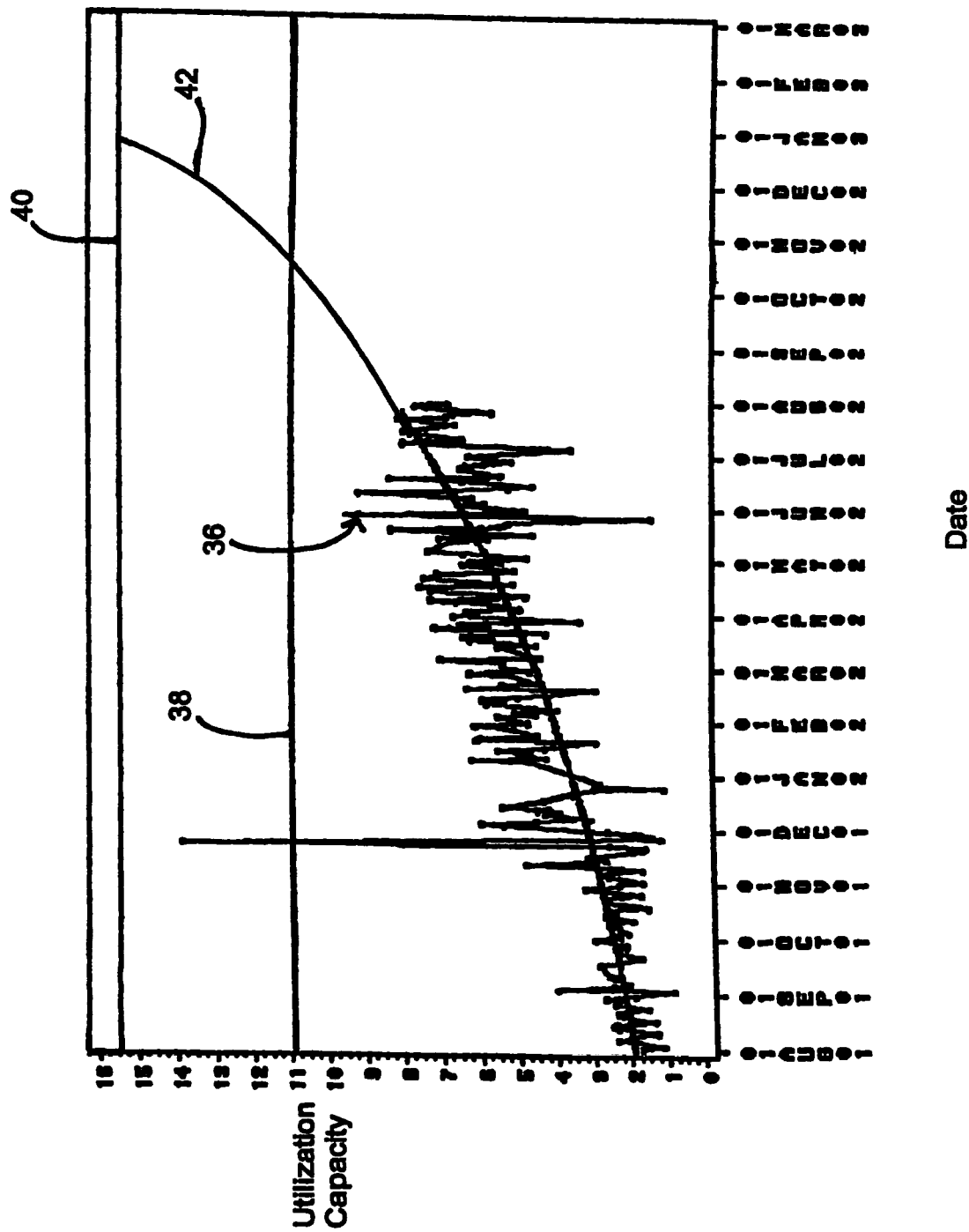
FIG. 4 is a graphical display illustrating the data modeling and analysis process of one embodiment of the present invention.

The processing unit (14) of the computer system (10) of the present invention selects a single forecast from the plurality of forecasts generated, as illustrated by box (30). In one embodiment, this is accomplished via the assignment of selection parameters by the user or analyst, as illustrated by box (34). These parameters may consist of a threshold value relating to the device data being analyzed or a predetermined time period. For example, the graphical display of FIG. 4, illustrates "device capacity" on the Y-axis, and "time" on the X-axis. In this example, a capacity threshold of 11 SPECint95, an industry standard performance benchmark, has been selected in order to enable the system to readily ascertain capacity readings above this threshold value. By setting such a threshold value, the user may instruct the system to single out forecasts showing capacity readings above or below a preset figure. In one embodiment, the threshold value is determined to be the point at which the capacity of the device or devices in question begin to degrade. In another embodiment, a threshold capacity of 70% measured in relation to the maximum capacity of the device is utilized.

Multiple selection parameters may be assigned to enable the system to single out individual forecasts having particular attributes. For example, if the user assigns a capacity threshold of 11 SPECint95 and a planning horizon of January, 2003, the graphical display of FIG. 4 would be flagged by the system such that further review may be conducted by an analyst. Specifically, the selected capacity of 11 SPECint95 is forecasted to exceed prior to the planning horizon date of January, 2003. Thus, further review of the device at issue is warranted, given the selection parameters.

Figure 5:
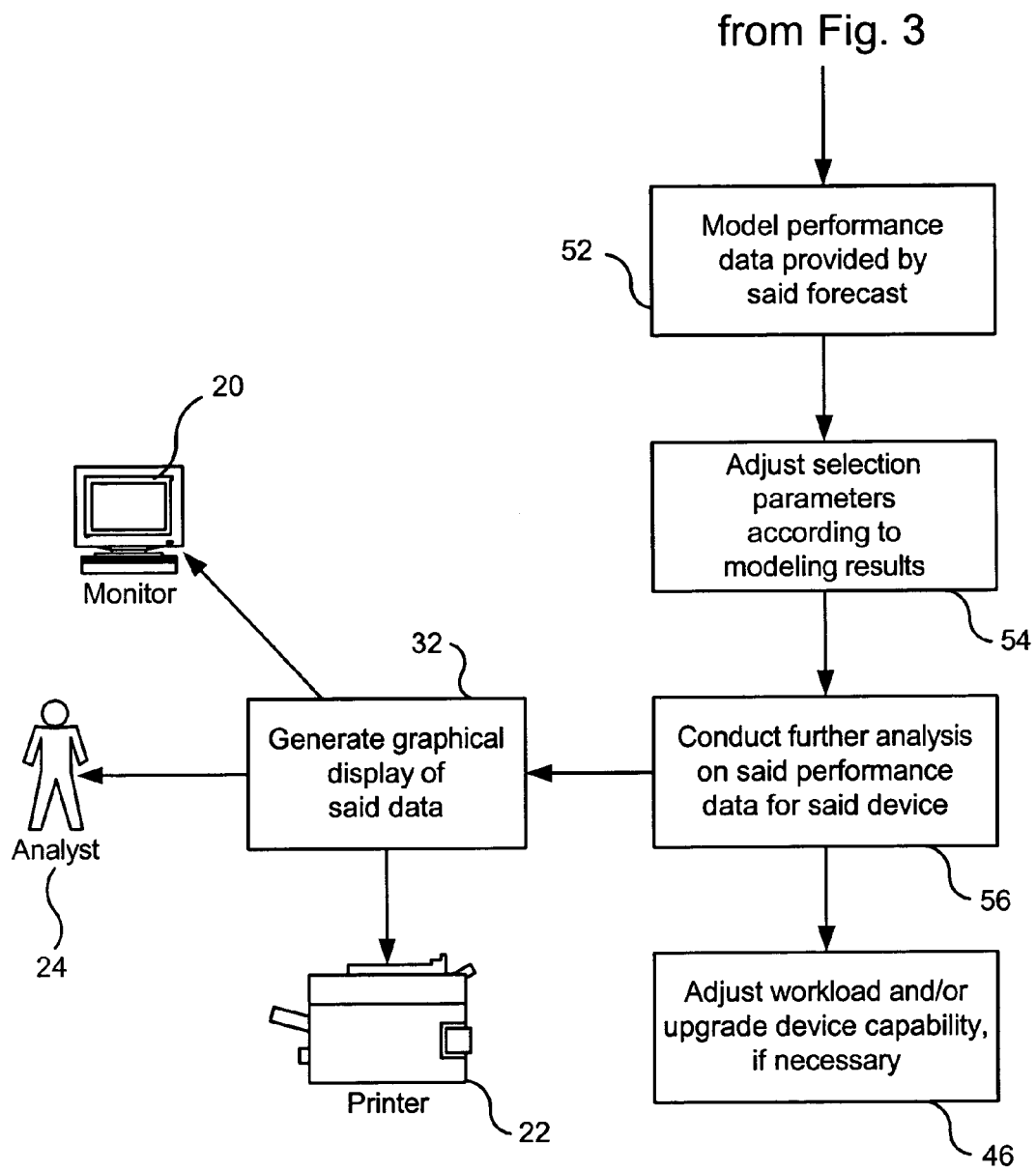
Figure 6:
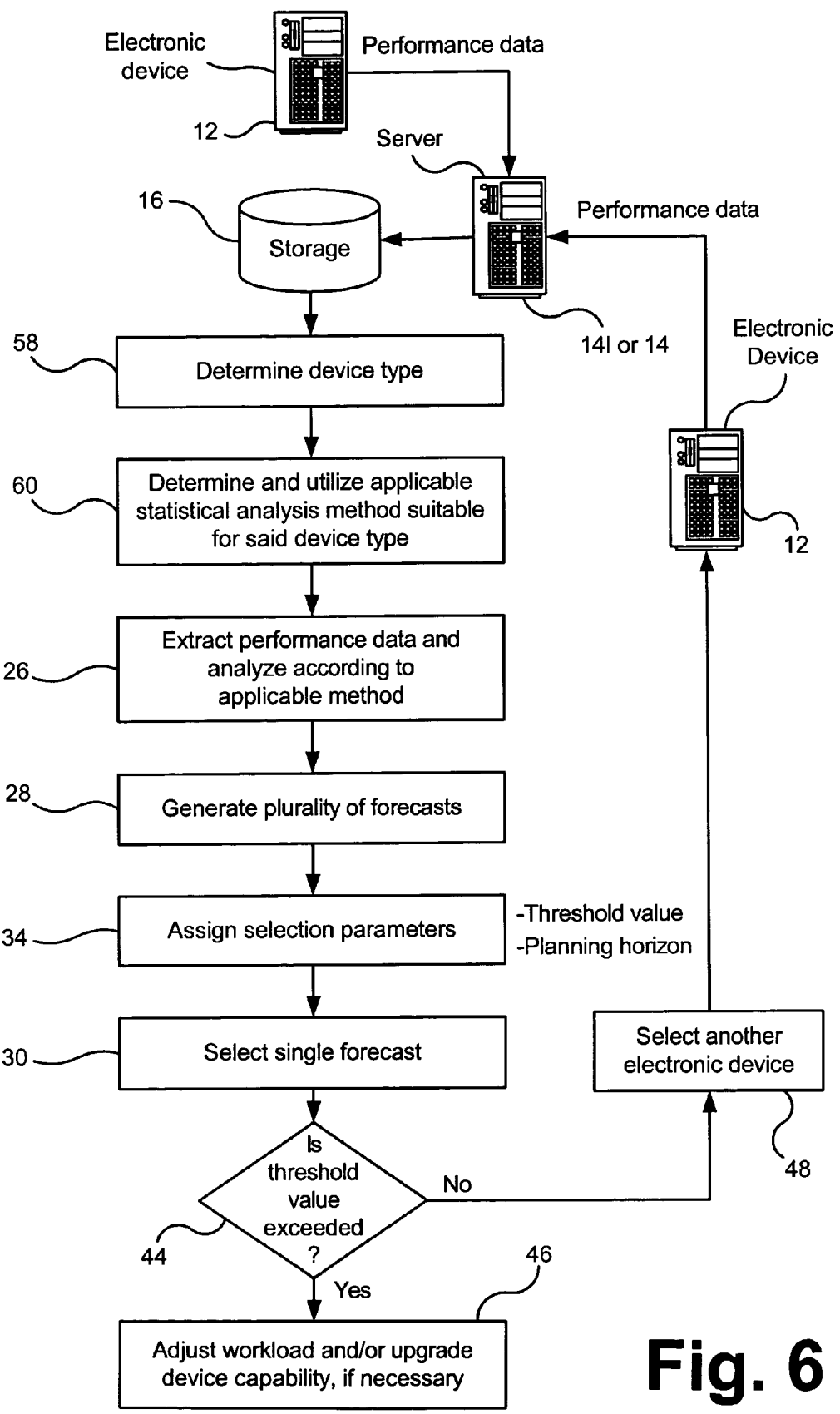

FIG. 4 graphically illustrates the actual capacity data (36), the selected capacity threshold (38), the total capacity (40), and the forecasted performance of a device (42) in light of collected performance data. In one embodiment, the planning horizon is chosen based on the estimated time it would take to repair and/or upgrade the device at issue. Further, in one embodiment, the single forecast selected by the system is the most conservative forecast relating to the device upon which statistical analysis has been performed. Thus, the present invention allows the user to save time and effort by reviewing only those forecasts indicating an urgent need for review, as illustrated by boxes (44) and (46) of FIGS. 5 and 6. This process may then be repeated for additional individual devices or an aggregate of devices, as illustrated by box (48).

Data modeling for the purpose of generating forecasts, as illustrated by box (52), is well known in the art. For the purposes of the present invention, any reasonable linear or non-linear statistical model (such as a polynomial or an exponential model) may be utilized to forecast when the capacity threshold of an electronic device will be exceeded. In one embodiment, a log-linear model is utilized because it provides conservative forecasts for many electronic devices. In many cases, the resource consumption growth of an electronic device will behave in a log-linear fashion. Thus, for many electronic devices, the log-linear model provides the most accurate forecasting results.

This model takes the form of $Y=Ac^{Bx}$, where Y is the actual capacity consumed, X is the time or date of consumption, c is the rate of exponential change, and A and B are model parameters to be estimated from the data. One may assume any value for c, or, in one embodiment, estimate the value of c from actual data. However, in this example, c is taken to be 2.71828.

In one embodiment, the forecasting procedure utilized by the present invention for this example model begins by converting the exponential model to natural logarithms, i.e., Ln Y=Ln A+Bx, and then utilizing linear regression to determine estimates of Ln A and B. In order to determine an estimate for Y, the present invention calculates $e^{Ln\ A+Bx}$ by replacing Ln A and B with their respective estimates. The use of linear regression is well known in the art and is available in many statistical analysis computer packages.

For the data shown in the example of FIG. 4, the estimate of Ln A equals −59.46628, and the estimate of B equals 0.00396. For example, if the date x is taken to be Aug. 1, 2001, the estimated capacity consumed would equal 1.97. Thus, the value of x utilized by the example of FIG. 4 is 15,188, which is the number of days from Jan. 1, 1960, to Aug. 1, 2001. As mentioned above, models different from the exponential method described above would require different methods for estimating the model parameters. It being understood that the present invention is capable of utilizing any of such statistical models during the analysis process.

Forecasting techniques may be applied either to peak, average, ninety-fifth percentile, minimum, or any other chosen statistic in order to provide a statistical confidence interval for each forecast. Further, the present invention may be applied to software applications executed by one or more electronic devices. In one embodiment, forecasts may be sorted by date in order to inform the user or administrator which device(s) require the most immediate attention. Further, each forecast may be reviewed and validated by one or more analysts familiar with the device at issue, as illustrated by box (50). In some cases, the analyst agrees with the forecasted data and begins an upgrade and/or adjustment of the device to prevent performance degradation. In other cases, forecasted data may be in error such that the analyst recommends that the forecast be disregarded, as illustrated by box (49).

Subsequent to the review of the selected forecasts by the analyst, the selection parameters discussed above may be adjusted according to the modeling results, as illustrated by box (54). Further, the statistical analysis methodology utilized by the present invention may be adjusted based upon the knowledge and experience of the analyst with respect to the device at issue. In one embodiment, additional statistical analysis as illustrated by box (56) is conducted utilizing adjusted selection parameters to create a subsequent graphical display for further review by the analyst, as illustrated by box (32). Different types of electronic devices may require different statistical analysis methodologies. For example, if the user desires to analyze a large system comprising a plurality of different types of devices, the planning horizon and threshold capacity would require adjustment. Further, the statistical methods utilized for each type of device may require adjustment in order to produce the most conservative forecast results. For example, a first statistical analysis method may take all of the input data into account such that each data point is weighted equally. However, a second data analysis technique may weigh the most recent data points more heavily, depending on which technique is being utilized. Thus, depending on the type of statistical analysis technique employed, the forecasted results will change accordingly.

In one embodiment, the present invention allows the user to choose from a host of statistical analysis methods complete with explanation as to what device types are most suited for each of said statistical analysis methods. Further, in one embodiment, the present invention provides the analyst with guidelines regarding the time required to upgrade/adjust various types of electronic components. This feature of the present invention allows the analyst to easily choose his or her selection parameters, thus providing the analyst or other user with enhanced efficiency and ease of use.

Further, the processing unit of the present invention is capable of determining the device type based upon the format of the data collected and stored upon the storage device, as illustrated by box (58). In one embodiment, the metadata characteristics of the performance data for each electronic device is utilized by the processing unit to determine the type of device at issue. Once the device type has been ascertained, the system is capable of automatically, or through manual direction, selecting and utilizing the most appropriate statistical analysis method and/or selection parameters suitable for the device type at issue, as illustrated by box (60). The above analysis process may then be repeated utilizing the methods/parameters best suited to the device(s) at issue.

It should be understood that the present invention is not relegated to the use of capacity data or any other particular number or type of device, as in the above example. On the contrary, the present invention may utilize any metric, or combination of metrics, such as intensities, in place of or in addition to system utilization data. For example, electronic device usage may fluctuate according to traffic and/or maintenance patterns. The present invention allows the analyst to adjust the forecasting results to compensate for peak and off-peak workload patterns, as well as maintenance or resource allocation procedures. This information may be stored on the storage device for use in conjunction with performance data collected from the device(s) during statistical analysis. Further, such information, through the display and reporting capabilities of the present invention, may assist the analyst in consolidating and/or adjusting workload or load balancing parameters.

This feature of the present invention is particularly useful when applied to a large number of electronic devices undergoing aggregate statistical analysis. Specifically, selected forecasts maybe aggregated in order to present the analyst with a performance overview of analyzed devices working in combination. This allows the analyst to conduct load balancing and/or consolidate workloads over multiple devices. The reporting capabilities described above may be utilized to provide the analyst with best and/or worst case forecasts designed to provide an overall "level of confidence". In one embodiment, this is accomplished through graphical and/or textual display of performance data.

Although the invention has been described with reference to specific embodiments, this description is not meant to be construed in a limited sense. Various modifications of the disclosed embodiments, as well as alternative embodiments of the invention will become apparent to persons skilled in the art upon the reference to the description of the invention. It is, therefore, contemplated that the appended claims will cover such modifications that fall within the scope of the invention.

We claim:

1. A method for use in managing electronic devices, including server computers, comprising the steps of:
   collecting and analyzing historic resource utilization data relating to a plurality of servers, said resource utilization data representing the load placed on a set of finite resources over a predefined period of time;
   storing said resource utilization data on a storage device;
   processing said resource utilization data and generating a plurality of forecasts including at least one resource utilization forecast for each server;
   assigning a threshold value for use in identifying servers whose forecasted resource utilization exceeds said threshold value within said predefined period of time;
   identifying the earliest forecasted date said threshold is exceeded for each said server;
   sorting said forecasts by said dates, identifying those that are in the greatest need of prompt attention to prevent a failure or performance degradation; and
   performing an act to prevent a failure or performance degradation of said servers, said act comprising at least one of: (a) performing further analysis with respect to said servers, and (b) adjusting one of the workload and the capability of said servers.

2. The method of claim 1, further comprising the additional step of:
   generating a graphical display of one or more of said forecasts.

3. The method of claim 1, wherein said plurality of forecasts are generated via statistical analysis of said performance data.

4. The method of claim 1, further comprising the additional steps of:
   modeling performance data provided by said selected forecast; and
   adjusting said threshold value based upon the results of said modeling.

5. The method of claim 4, further comprising the additional step of:
   subjecting said electronic device to additional analysis utilizing said adjusted threshold.

6. The method of claim 1, wherein said selected forecast comprises the forecast representing an acceptable level of performance degradation associated with said electronic device.

7. The method of claim 1, wherein said selected forecast comprises the most conservative forecast of said plurality of forecasts.

8. The method of claim 1, further comprising the additional step of:
   validating said selected forecast.

9. The method of claim 1, further comprising the additional steps of:
   determining a device type associated with said electronic device being analyzed; and
   adjusting the statistical analysis being applied to said electronic device based upon said device type.

* * * * *